United States Patent [19]

Miller

[11] Patent Number: 5,612,903
[45] Date of Patent: Mar. 18, 1997

[54] PROCESS FOR OBTAINING BALANCED COLOR PRINTS

[76] Inventor: Bertram W. Miller, Apartado Postal 316, 45900 Chapala, Jal., Mexico

[21] Appl. No.: 382,188

[22] Filed: Feb. 1, 1995

[51] Int. Cl.$^6$ ........................................... G02F 1/00
[52] U.S. Cl. .................. 364/526; 364/525; 355/35; 355/32; 396/563
[58] Field of Search .................. 364/525, 526; 347/232; 395/126, 131; 354/1, 3, 410, 412; 355/35, 32; 358/448, 518, 514, 504; 356/403–409, 420, 425

[56] References Cited

U.S. PATENT DOCUMENTS

| | | | |
|---|---|---|---|
| 3,392,626 | 7/1968 | Miller et al. | 355/35 |
| 4,166,701 | 9/1979 | Miller | 356/404 |
| 4,257,702 | 3/1981 | Miller | 355/71 |
| 4,468,123 | 8/1984 | Miller | 355/35 |
| 4,975,862 | 12/1990 | Keller et al. | 364/526 |
| 5,481,480 | 1/1996 | Green et al. | 354/3 |
| 5,485,284 | 1/1996 | Shono et al. | 358/518 |

Primary Examiner—Emanuel T. Voeltz
Assistant Examiner—Hal D. Wachsman

[57] ABSTRACT

The color balance of color photographic printing paper is determined by making three successive exposures of separate portions of a sample sheet of printing paper through a neutral-color optical wedge of linear density gradient, each exposure consisting essentially of a different primary color of light of predetermined intensity and duration selectively to stimulate each of the three color-sensitive emulsion layers in the printing paper. The three images produced upon development provide a means for objective quantitative measurement of the relative absorptions for red, green, and blue light by each of the dye images. The relative absorptions are arrayed in the form of 3×3 mathematical matrices. Solving the matrices in several permutations allows the comparison of actual dye densities that form any one of a number of standard colors with the dye densities that form the image of a test print. The differences between the compared dye densities are converted by division of the differences by the slope of the paper's sensitometric curve to log Exposure differences. The log Exposure differences are delivered as test program correction factors.

3 Claims, 4 Drawing Sheets

PROCESS FOR OBTAINING BALANCED COLOR PRINTS

BACKGROUND-FIELD OF INVENTION

This invention relates to balancing color and determining exposure of photographic color printing materials with the purpose of producing optimum results within the capabilities of the materials used.

BACKGROUND-DESCRIPTION OF PRIOR ART

The present invention has application in various photographic processes wherein a positive print is produced from a color negative using materials known as integral tripacks that have three superimposed light-sensitive emulsion layers. It is also applicable, generally, to all color photographic processes, including positive to positive printings and to photo-lithography. Those skilled in the art will appreciate that it is rarely if ever possible to produce a print with accurate color rendition without adjusting for color-balance variations caused by color-mix changes in lighting conditions and changes in the characteristics of films and printing papers. Those skilled in the art appreciate also that there is interdependence between color-balance and print density, the result of overall exposure. The exact relationship between exposure and color balance, though, is generally unknown. It is usual to treat exposure and color-balance as separate entities. The dictum of those skilled in the art is to treat first with exposure before tackling color-balance as a problem. It is the thrust of this process that such concept is a mistake and leads to much of the difficulty that all color printers experience in their work. Density and color balance must be treated simultaneously. The present process accomplishes this.

Negative-positive processes provide substantial latitude in making color correction in printing the negative by selective variation of red, green, and blue light exposures. There are two principal techniques for making such exposure variations in present use. In tricolor additive printing, three separate exposures of the negative to the printing paper are made respectively by red, green, and blue light. These exposures may be made sequentially, changing red, green, and blue color filters between exposures. They may also be made simultaneously using printing equipment such as enlargers fitted with three different light sources, each light source being one of the said primary colors: red, green, and blue. The intensity of each of the light sources can be varied independently to obtain the proper relationships of exposure to produce a balanced color print. In white light subtractive printing, a single exposure of the negative to the printing paper is made through a combination of colored filters, wherein filter densities and colors are varied to control color correction, thereby selectively filtering out varying amounts of the primary colors of light. In either case, selectively varying the exposures of the primary colors of light to the printing paper achieves color balance, exposure being the product of light intensity and duration. Such colored light variations produce corresponding variations in the production of complementary colored dyes by the three emulsion layers. Red light produces cyan dye, green light produces magenta dye, and blue light produces yellow dye.

Most prior art color balancing techniques employ visual color judgments using test prints. Visual judgments are inevitably and notoriously faulty for reasons that will become apparent in the presentation of the present disclosure. Of particular application to the white-light subtractive printing technique is the use of color filters for viewing a test print to make a judgment as to filtering changes for making subsequent prints. Another visual judgment technique is to make a "ring-around." A "ring-around" is a central exposure of the negative on a single sheet of paper surrounded by a number of different exposures of the same subject, each exposure varying from the central one by a given change in white-light filtration such as +0.05, +0.10, +0.15 ... yellow or −0.05, −0.10, −0.15 ... magenta. Such "ring-arounds" are crude attempts and can be, at best, no better than ± the density claimed for the filters. The present process provides objectively balanced programs for the color analyzer or other measurement of printing parameters, which are precise to ±0.01 log E units.

Less subjective techniques involve the use of electronic color analyzers to detect changes in color balance from negative to negative. Proper use of all such color analyzers for this purpose requires information as to the exact sensitometric characteristics of the printing paper being used. Due to charges in storage conditions and age, no two boxes of color printing paper can be depended upon to have precisely the same color balance. Therefore, upon starting a new box of printing paper, a test print is made to obtain the necessary color balance information, which is then used to reprogram the color analyzer. Here again, even the most sophisticated prior art techniques resort to subjective visual judgment in obtaining such color balance information about the new printing paper to be used. It is well known among those well-versed in the art that the dye structure of the color negative enters importantly in the response by the printing paper to negatives of different manufacture, or even to different lots of negatives of the same brand. Two such different negatives, even when a color analyzer or a color transmission densitometer shows them to have identical red, green and blue density readings for a reference object, are likely to print to a different color balance on the same lot of color printing paper. Therefore, it has been my practice when balancing color papers to do so in combination with a particular emulsion number of negative color film. When changing to another emulsion number of color negative film, while still using the same box of paper, another test must be made. In the present process the combination of specific emulsion numbers of film and paper automatically puts this requirement into effect.

Another form of visual judgment uses an apparatus known as the "video color analyzer," essentially a modified television receiver whose input is the color negative. The video color analyzer is provided with controls that reverse the negative image to a positive one and which allow the operator to vary the colors of the screen image to give, as judged by eye, a reasonable representation of the subject photographed. This technique makes no precise allowance for the characteristics of the color printing paper being used. Additionally, the colors generated on the phosphor screen of the cathode ray tube are not those of the dyes incorporated in the papers. Whatever cross-absorptions (to be discussed later) are present in the colors of the phosphors are not known nor used except tangentially and unknowingly when viewing the "corrected" screen image. This is another visual judgment. It is notoriously true that the photographic laboratories that employ video analyzers do not depend on them for the final determination of color print balance in high quality color prints. Their output is used as an intermediate step for further test printing and additional visual judgment. There is a multiplicity of trials-and-errors involved for each order of printing from outside photographers even in the largest, most experienced and most productive commercial laboratories. The present method, on the contrary, compares the paper dyes with themselves and calculates the "arrastres," or cross-absorptions (to be described shortly), of said dyes into the result. The present method homes-in on both overall exposure and color balance simultaneously, quite usually with only one test. A second test is infrequently needed, and then, only when the calculated corrections are great. Experience has shown a second test to be all that is necessary in such instances. What is more, the present invention allows the choice of almost unlimited reference subjects found in general photographic practice. Even when one reference subject has been chosen, the same data will produce the corrections for a different reference subject. Standard references are incorporated in a computer program that facilitates the use of the present method. Provision is made for selection of standards of the user's choice, not included among those provided. Such addition al choice allows commercial illustration photographers closely to match prints to commercial subjects.

Machine Made Color Prints

Among the billions of color prints that are produced each year, the vast majority are produced by automatic and semi-automatic printers located in plants which mass-produce color prints. Because of their sheer weight of numbers they must be mentioned among other forms of color printing. However, when it comes to color quality this system is a non-contender. The printing machines are equipped with three sensors, either photo multiplier tubes or light sensitive diodes, each reading the entire film format and each sensing a different one of the three primary colors. These machines are equipped with sets of buttons that enable the machine's operator to override the machine and produce changes in image color. The button controls, necessarily, are in themselves coarse; they change the exposure of the color exposure they each control by about 0.05 log Exposure units per step. It is noted here that ±0.05 log Exposure unit is ±12.2%. Most operators are inexperienced in evaluating color balance of a given negative. The buttons mainly are used to remake prints returned by dissatisfied customers for reasons of obviously faulty color balance. Here, too, little or no consideration is taken of the intrinsic color balance of the paper being printed upon; none is taken of the arrastres or cross-absorptions. These laboratories confine their work mainly to the 35 mm format. The manufacturers of 35 mm negative color films provide edge markings that appear on the negatives with processing. These edge markings are designed to be read by the printing machines to give better average color representation than would otherwise obtain. The results, in large part, are commercially acceptable prints made for a populace that has been trained to be uncritical. That is a different populace than the one that patronizes custom laboratories and at which this invention is directed.

Color-balancing by Means of Colored Matrices

In one popular technique, a picture is first taken of a standard gray card, whereupon the gray card negative is printed through a matrix of colored filters onto a sample sheet of the printing paper. By visual comparison, a gray patch is then found on the print, allegedly enabling the selection of an appropriate filter combination for color balancing the system. The color analyzer can then be programmed to a modification of the filter combination to compensate for the characteristics of the printing paper. Different color negatives can then be tested for color balance by the color analyzer, enabling exposure corrections to be made regardless of whether tricolor additive or white-light subtractive printing is then used. The drawback to this method is that, necessarily, the color density differences between elements of the matrix are larger than one would wish. Were it to work well—its lack of general popularity says it does not—one is still be left with the fine tuning of color balance by eye, the most difficult stage of all. Even more, the absorptions of the filter gels in the matrix are not really good approximations of the dichroic filter absorptions of the vast majority of the enlarger colorheads in common photographic use.

There are other visual judgment techniques too numerous to mention. All must and do fail on the ground that the dyes which are useful in color photography and in photo-lithography are not the perfect dyes which are used to define color reproduction as a theoretical abstraction. The lack of perfection of the dyes is a large part of the cause for much of the difficulty in making visual color printing corrections. The great difficulty with visual judgment lies in the condition that, as balance is more closely approached, the eye finds it increasingly difficult to appraise where imbalance lies.

The Arrastres and How They Affect Color Balance

The term "arrastres," the Spanish for "that which is dragged along," was suggested by some Mexican students. The term is used to signify the cross-absorptions that are exhibited by each of the complementary-color dyes: cyan, magenta, and yellow, used in color printing. It is a handy term that is not readily confused with other less specifically defined terms; I shall use it throughout this presentation. For the purposes of conveying understanding of this process, the primary absorption of cyan dyes is defined as red light, of magenta dyes as green light, and of yellow dyes as blue light. For the purposes of this disclosure I shall class all other absorptions as arrastres. The arrastres of importance to this invention are those which involve red, green, and blue light absorption.

Optically Perfect Dyes

An optically perfect cyan dye must absorb red light in proportion to its density but freely pass green and blue light. Such perfect cyan dye does not exist in photography. All cyan dyes met with absorb varyingly large amounts of green light and blue light. A perfect magenta dye should absorb green light in proportion to its density and freely pass blue and red light. None of the available magenta dyes approaches this degree of perfection. A perfect yellow dye should absorb blue light proportional to its density and freely pass red and green light. Although the usual yellow dyes which one meets in photographic practice are better in this regard than are their cyan and magenta counterparts, still they absorb small amounts of red light and somewhat greater amounts of green light. Apart from the problems they cause in color balancing, such degraded dyes muddy the color of the prints they make even when nominal color balance is arrived at vis-a-vis the gray card representation. Nevertheless it usually is possible to arrive at a good match for the standard gray card. Dyes whose arrastres are exceptionally great will misrepresent other colors. The big handicap caused by the imperfections of the dyes becomes apparent when one attempts to make a color printing paper come to color balance by visual means.

For example, the factor in a cyan dye that absorbs green light is called the cyan-green arrastre or the cyan dye-green arrastre. The factor in a cyan dye that absorbs blue light is called the cyan-blue arrastre.

The cross-absorptions or arrastres represent color, from a light-absorption point of view, just as effectively as do the cyan, green, and yellow dyes, themselves with reference to their primary absorptions. The green arrastre of the cyan dye, for example, represents a real magenta, relatively, as does the magenta dye itself. Thus, a cyan exposure correction carries with it about half as much magenta change, as well, in the same direction. The person doing the printing is typically unaware of this. This unawareness and failure to compensate are at the root of many visual judgment errors. The same applies to the magenta arrastres and to the yellow arrastres. All the cross-absorptions must be taken into account as playing an important part in the final color image on the color printing paper. Such taking into account is the fundamental basis of this method. The whole is truly the sum of its parts! Consideration of the importance of the arrastres when using color printing papers is entirely novel with this process, heretofore unrecognized, unremarked upon, and dismissed with respect to color printing papers. Color negative films were recognized to have a similar problem that was solved, with varying degrees of success, by incorporating colored color couplers in the film emulsion. The colored couplers compensate for, wholly or in part, the dyes' arrastres. It is impossible to use corrective masking in color printing papers because the addition of mask color would be intolerable. True and prompt arrival at color balance for any given paper is impossible without considering these unwanted arrastres.

Variations in Arrastres

Within certain narrow limits, the arrastres of a given brand of color printing paper will vary little from one emulsion number, or lot, of paper to another, since they are a characteristic of the dyes incorporated in the paper emulsion. A change from one color developing agent to another may produce a much greater variation because the dye that forms is a compound taking part of its molecule from the color former in the paper emulsion and the rest of its molecule from the oxidized color developing agent. Greater variations in arrastre composition occur with papers from different manufacturers. Since knowing quite exactly the dimensions of the arrastres enters into the design and use of this method, a means and technique for measuring the cross-absorptions, the arrastres, of the three dyes: cyan, magenta, and yellow of a given paper's emulsion layers are incorporated in this process and will be described. The nominal absorptions of the three dyes and their arrastres measured from a typical widely-used color printing paper are tabulated below in a 3×3 matrix. The matrix tabulation is chosen because the mathematical technique for solving it for each of the three constituent dye densities is well known.

| Color Absorbed | Cyan Dye | Magenta Dye | Yellow Dye |
| --- | --- | --- | --- |
| Red | 1.00 | 0.05 | 0.04 |
| Green | 0.50 | 1.00 | 0.12 |
| Blue | 0.20 | 0.39 | 1.00 |

The magnitude of the arrastres becomes apparent with study of this actual matrix. The arrrastres certainly are factors with which one has to contend even though, until the present, they have been ignored.

Prior Objective Color Balancing Art

Several prior art techniques have been directed toward solving the color balancing problem in an objective manner. U.S. Pat. No. 3,392,626, Miller et al., Jul. 16, 1968, is effective, but is laborious and time consuming. The paired U.S. Pat. No. 4,166,701, Miller, Sep. 4, 1979, and U.S. Pat. No. 4,257,702, Miller, Mar. 24, 1981, have resulted in objectively gotten color balance and exposure control, but have some minor procedural drawbacks. Their use is too slow for use in large commercial laboratories, and from time to time there has been a small tendency to overshoot the corrections. U.S. Pat. No. 3,392,626 requires measuring reflection densities corresponding to discrete values of step wedge density for each of the three color-separated color exposures. Then one plots graphs from the density measurements, and finally makes numerical calculations from the graphs to provide color balance data. It is quoted here because it provides a means for controlling sequential tri-color exposures. The combination of U.S. Pat. No. 4,166,701 and No. 4,257,702 that produces an image on the color printing paper made through a continuous wedge of uniform density gradient, particularly when used in the white-light mode, and which gives a direct readout of corrections to the color analyzer program, was a great improvement over what had gone on before. But, as has been said, was time consuming, particularly for large scale commercial operation.

The present method provides a greatly simplified, accurate, rapid, and completely objective technique for ascertaining the color balances of photographic printing media, particularly color printing paper, without reliance on subjective visual judgment. It is the only method that completely considers the arrastres of the color printing paper's dyes. It is a novel and previously unrecognized process that uses the arrastres instead of lighting them.

SUMMARY OF THE INVENTION

According to the present process, the color balance and the exposure index of color printing media, color printing paper in this embodiment, having superimposed emulsion layers, is ascertained by forming a single test image made of a specific object in a color negative. The specific photographed object may be a standard photographic gray card of nominal red density 0.70, green density 0.70, and blue density 0.70; the skin color of a Caucasian person, of an Afro-American person, or of an Hispanic person; of average green foliage; or any other chosen subject whose reflective color densities can be measured.

A means and technique for measuring the arrastres of the three dyes: cyan, magenta, and yellow of the paper's emulsion layers are described. Such means and technique are an integral part of the present invention. The nominal absorptions of the three dyes and their cross-absorptions, of a commonly used color printing paper, are tabulated in a 3×3 mathematical matrix, which is repeated below for convenience:

| The Determinant | | | |
| --- | --- | --- | --- |
| Color Absorbed | Cyan Dye | Magenta Dye | Yellow Dye |
| Red | 1.00 | 0.05 | 0.04 |
| Green | 0.50 | 1.00 | 0.12 |
| Blue | 0.20 | 0.39 | 1.00 |

The mathematical solution of the above matrix results in the Determinant, a known mathematical quantity. In this case the value of the Determinant is 0.9292, an acceptable value. Any value unequal to zero is acceptable. Zero determinants are forbidden because in further calculations they are used as the divisor, and division by zero is not definable. A standard gray card application is to be used as the example in the embodiment which follows.

The nominal color densities of the 0.70 density neutral gray card used in photography are red 0.70, green 0.70, and blue 0.70, but such exactitude is infrequent in commercially available gray cards. If one substitutes these three 0.70 densities in the left or first column of the 3×3 matrix below we may solve the matrix, and then divide the solution by the Determinant to arrive at the cyan dye density needed to provide the cyan dye part of the neutral gray image that is being striven for. The value for the cyan dye density in this case is 0.6665, rounded off to 0.67.

| The Cyan Dye Density of the Gray Card Image | | | |
|---|---|---|---|
| Color Absorbed | Cyan Dye | Magenta Dye | Yellow Dye |
| Red | 0.70 | 0.05 | 0.04 |
| Green | 0.70 | 1.00 | 0.12 |
| Blue | 0.70 | 0.39 | 1.00 |

In the matrix next below, the gray card color densities, each 0.70, have been substituted in the second column. When this matrix is solved, and the solution divided by the Determinant, the quotient is the magenta dye density required to produce, in combination with its cyan dye density and yellow dye density counterparts, the neutral 0.70 density looked for. In this case the magenta dye density is 0.3133, rounded off to 0.31.

| The Magenta Dye Density of the Gray Card Image | | | |
|---|---|---|---|
| Color Absorbed | Cyan Dye | Magenta Dye | Yellow Dye |
| Red | 1.00 | 0.70 | 0.04 |
| Green | 0.50 | 0.70 | 0.12 |
| Blue | 0.20 | 0.70 | 1.00 |

Finally, the three 0.70 color densities, representing neutral gray of 0.70 density, have been substituted in the third column. This new third matrix is solved and the solution is divided by the Determinant. The quotient of that division is the yellow dye density needed to produce 0.70 neutral density. The yellow dye density is 0.4444, rounded off to 0.44.

| The Yellow Dye Density of the Gray Card Image. | | | |
|---|---|---|---|
| Color Absorbed | Cyan Dye | Magenta Dye | Yellow Dye |
| Red | 1.00 | 0.05 | 0.70 |
| Green | 0.50 | 1.00 | 0.70 |
| Blue | 0.20 | 0.39 | 0.70 |

It is likely that the wide disparity of the densities of the three dyes, required to produce neutrality, will surprise many who are not extremely well-versed in the art of photographic color printing. It goes to emphasize the importance of knowing about, and the ability to handle the arrastres.

The same procedures may be, and are followed to find what dye densities are needed to match any standards, other than the gray card, that may be set up, be they the various skin colors, average green foliage, or any other color whose densities are measurable with a reflection densitometer. The difference will lie in using the cyan, magenta and yellow densities taken from the new standard for the those of the gray card color densities which were used in the previous example, The Test Print Exactly the same procedure is used when a test print is made. The red, green, and blue densities of the test print are measured. The cyan, magenta, and yellow dye densities that would produce the test print are calculated, using: the 3×3 matrix exactly as was the case with the gray card standard. These dye densities are then subtracted from the dye densities calculated to produce the color of whichever reference standard has been selected. When doing negative-positive printing, the subtractions keep the signs correct. In the case of positive-positive printing, the dye densities for the standards are subtracted from the dye densities of the test print, which properly turns the signs around.

The dye densities differences that are obtained this way will be, depending on sign, what dye densities have to be added or taken away from the dye densities already present in the test print to bring the test print substantially to match its standard of reference. These are not the changes in exposure that will be needed. One divides the desired dye density changes by the paper's gamma to arrive at the necessary exposure changes. For the purpose of this process, contrast, termed gamma in photographic usage, is the slope of the sensitometric curie of the color printing paper in the region from density 0.50 to density 1.00. The quotient of each such division will be the exposure change needed respectively for each of the three primary colors of exposing light. The exposure changes, numerically, are log Exposure changes since densities and log E's are both logarithmic functions.

One further step is required. The red exposure change is taken as the needed change in the exposure index of the paper. The sign of the red density change is then reversed and the sign-reversed quantity is added to the magenta and and to the yellow exposure changes. The two sums become, respectively, the changes in the green and the blue light printing programs in log Exposure units.

One then modifies the parameters of the trial print by the calculated corrections to produce a final printing program.

The computations required in this process are time-consuming and, for many persons involved with color printing, may be difficult to follow. All such difficulty is readily obviated when an object program incorporating the entire color balancing method is written to control a general purpose data processor or computer. Therefore the computer plays a central role each step of the way from the very beginning to the very end. It is the storage and retrieval mechanism by which the entered data are utilized and is programmed to make and deliver, almost instantaneously, all the required calculations accurately and repeatably. It is also programmed to direct the worker to make the proper examinations of the printing material in sequence, and to enter the results of said examinations into the data stream of the computer.

In one embodiment it is envisaged that the paper manufacturer may provide a programmed floppy disk with salient paper data already installed. In such case the user would have only to select the color standard and to make the test print.

The novel features believed characteristic of the invention are set forth in the appended claims. The nature of the method, however, as well as its essential features and advantages, may be understood more fully upon consideration of illustrative embodiments when read in conjunction with the accompanying drawings wherein:

BRIEF DESCRIPTION OF THE DRAWINGS

FIGS. 1, 2, 3, and 4 illustrate known pieces of equipment, which may be used in practicing the present invention.

FIG. 1 illustrates a general purpose photographic enlarger 10 having a head 12 which is equipped with a lamp 14 for producing light through a lens 16 at selected hights above a baseboard 18. A negative carrier 20 is disposed in the head 12 between the lamp 14 and the lens 16. The head is provided with a drawer 22 for inserting filters in the light path above the negative. In addition, a holder 24 is provided for inserting filters beneath the lens 16. The voltage of the lamp 14 is preferably controlled by a device 26, the significance of which is discussed below.

FIG. 2 illustrates a color analyzer 30, also known as an easel-reading transmission-type densitometer, a variety of which is presently marketed. The color analyzer 30 is equipped with a probe 32 having an aperture 34 through which the light to be analyzed passes. The color of the light to be analyzed, whether red, green, blue, or neutral is selected by means of a color-channel control knob 36. A meter 38 having a needle 40 and density and time scales is provided for controlling light intensity and exposure time as described below. The color analyzer 30 is provided with four attenuator controls 42, 44, 46 and 48, one for each of the four color channels, which may be used to give quantitative readings of optical density as determined by the settings.

FIG. 3 illustrates a reflection-type densitometer 50, which is capable of measuring the optical density of a color photographic print as well as the surface density of other objects. The densitometer comprises a probe 52 having a lens 54 through which test light emerges and reflected light returns. The color of the emerging test light, whether red, green, blue, or neutral is selected by means of a color-channel control knob 56. Reflected light is sensed and displayed in units of optical density by a readout 58. A control 60 is provided for adjusting readings to zero optical density.

FIG. 4 illustrates a specially equipped easel, generally indicated by reference numeral 110, for preparing a specimen of color printing paper for analysis. The easel 110 has a frame 112 with a carriage 114 slideably disposed therein in the manner depicted. Clips 116 are provided for securing printing paper to the carriage 114. A light-proof cover 118 is hinged to one edge of the frame 112. Fitted into the cover 118 is a color-neutral optical wedge 120 of finear density gradient. Of the available wedges, it is preferred that the wedge 120 be a precision type which varies continuously in opacity by ±0.50 optical density units from its midpoint. Also in the cover 118 is an aperture 122 conveniently spaced from the optical wedge 120. The aperture 122 is superfluous to this invention and is not used. Hinged flaps 124 and 126 are mounted on the cover 118 for selectively covering respectively the optical wedge 120 and/or the aperture 122 in the depicted manner. The frame 112 of the easel 110 is equipped with means for selectively positioning the carriage 114 in three different positions for making successive exposures of a color print through the wedge 120. The positioning means, which are provided to facilitate proper spatial arrangement of the carriage 114 by the user in complete darkness, may take the forth of mechanical stops that can be felt as the carriage 114 slides in the frame 112 as indicated by the arrows. The stops 128 may, for example, comprise spring-loaded ball bearings that protrude from the frame 112 as shown to interfere slightly with the leading edge of the carriage 114 as it slideably engages the inside walls of the frame 112. Alternatively, a set of marks (not shown) can be placed at appropriate points on the surface of the frame 112, so that they can be felt by the fingertips for proper positioning of the carriage 114 in the dark.

FIG. 5 illustrates a color print 130 prepared from a representative sample sheet of color printing paper in accordance with the inventive method. The print 130 comprises three separate test images exposed through the optical wedge 120. The fourth, smaller and uniform image 138 is not part of this invention. The images 132, 134, and 136 are made by predetermined finearly varying exposure to a different primary color of light, which may be achieved using; color separation filters and the optical wedge 120 or any equivalent means.

A Preferred Method of Practicing the Present Invention

Figure 1:
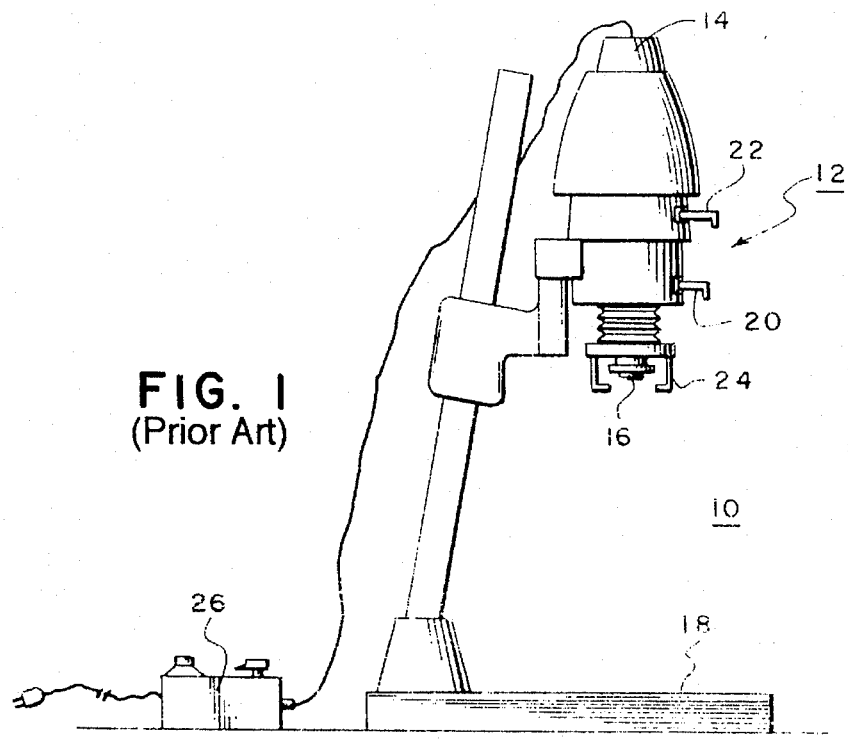
FIG. 1 is a vertical elevation of a photographic enlarger for use with the present invention.
Figure 2:
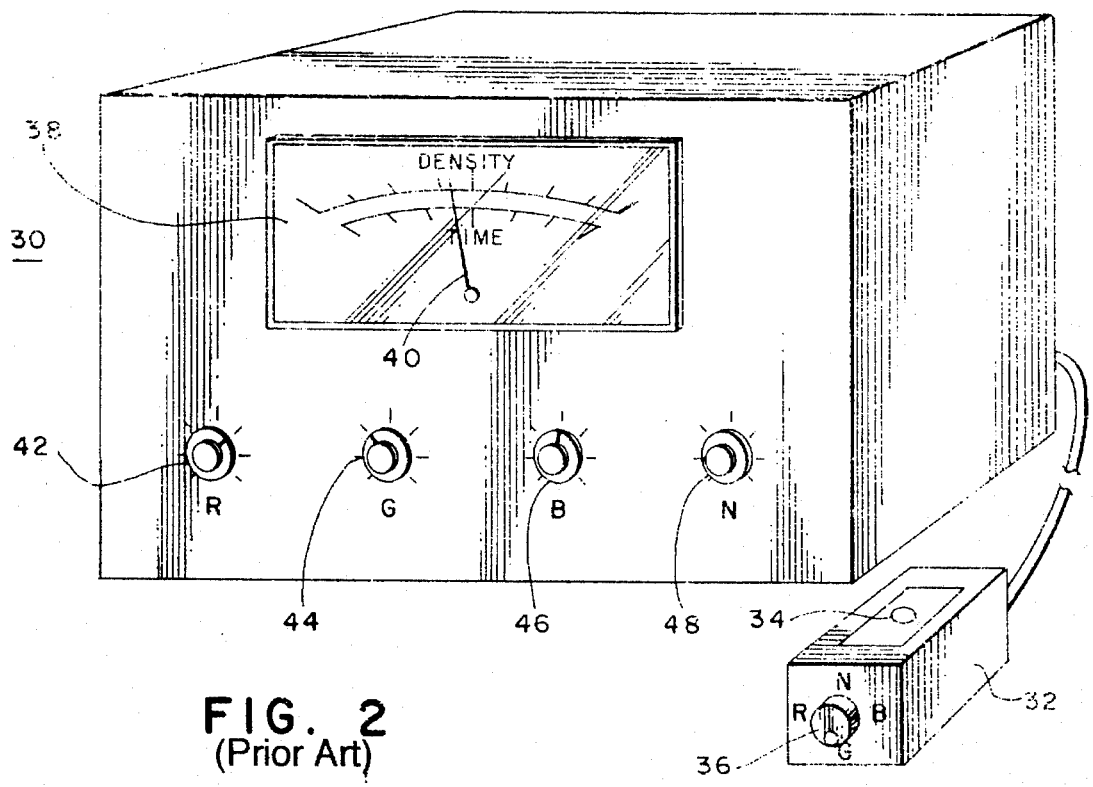
FIG. 2 is a view in perspective of a color analyzer for use with the present invention.

A preferred method of practicing the present invention will now be described by way of an illustrative example. First it is necessary to prepare the enlarger 10 of FIG. 1 to permit the generation of predetermined separate exposures for each primary color of light. The enlarger 10 is set up so that the head 12 is sufficiently high to project onto the baseboard 18 a field of illumination having a diameter roughly three times the length of the optical wedge 120. The color analyzer 30 of FIG. 2 is programmed for sensitivity by setting the red, green, and blue attenuators 42, 44, and 46 to a reasonable combination of settings that previous practice has shown will provide dye images of the optical wedge 120 shown in FIG. 4 of sufficient density for the purposes of this method. In this application the critical factor is that each of the three dye images of the optical wedge must present a minimum density of 1.00 for its complementary color, red density for cyan, green density for magenta, and blue density for yellow.

With the color analyzer 30 programmed, the probe 32 is placed on the baseboard 18 of the enlarger 10. A red filter of good quality optical gelatin, such as a Kodak Wratten™ tricolor is placed in the holder 24 beneath the lens 16. Working in the dark so as to confine all meter readings to the measurement only of light being emitted from the enlarger lens 16 the control 36 of the color analyzer probe 32 is switched to the red channel. The aperture (not shown) of the enlarger lens 16 is then varied until the meter 38 reads some arbitrary selected value, known previously to be suitable, which is defined as the zero point. Next, a suitable green filter replaces the red filter in the holder 24 and the control 36 of the color analyzer is switched to the green channel. Without altering the aperture setting of the lens 16 the intensity of light emitted from the lamp 14 is varied until the needle 40 falls on the previously selected zero point. Although there are a variety of means for varying the light intensity of the lamp 14, it is presently preferred that the lamp voltage be varied by a device such as the device 26 that is described in U.S. Pat. No. 3,392,626. The device 26 that is serially connected between the lamp 14 and a regulated voltage source (not shown) comprises three channels for selectively operating the lamp 14 at three different voltages. With the lamp intensities of both the red and green exposures set on attenuators 42 and 44, the device 26 is switched to its third channel, an appropriate blue filter is inserted in the holder 24 in place of the green filter, and the control 36 of the color analyzer 30 is switched to its blue channel. The voltage of the lamp 14 is then varied by the device 26 again to bring the needle 40 to the zero point. At this stage, the programmed settings of the color analyzer 30 have been translated into voltage settings on corresponding channels of the device 26 such that subsequent exposures may be made at predetermined light intensities corresponding to the programmed settings of the color analyzer.

Making the 3-Color Separations Print For Dye Absorption Studies

Figure 4:
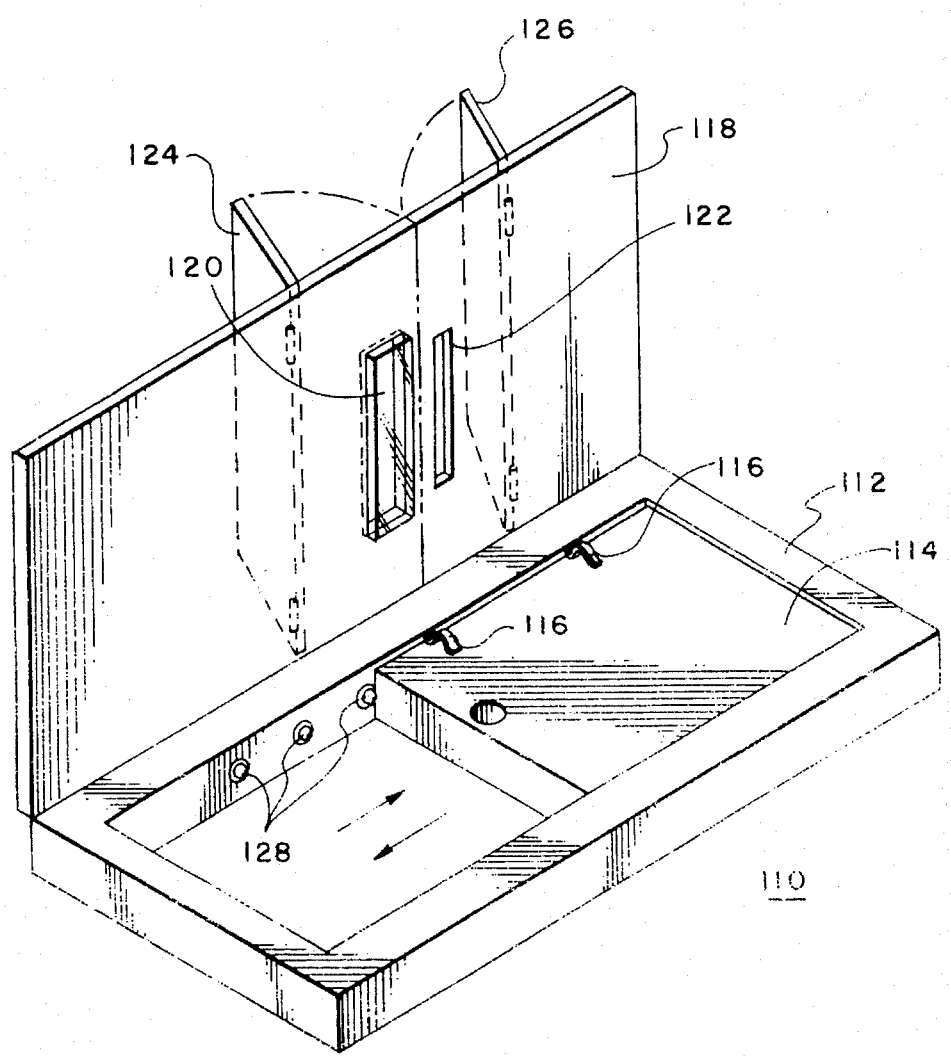
FIG. 4 is a view in perspective of an easel construction for use with the present invention.

The preferred procedure for making the color separations test sheet 130 of FIG. 5 will now be described. The easel 110 of FIG. 4 is positioned on the baseboard 18 of the enlarger 10 shown in FIG. 1, so that the optical wedge 120 will lie in the middle of the projected field of illumination from the lens 16. Working now in complete darkness, a sample sheet of color printing paper is secured in place on the carriage 114 using the clips 116. The carriage 114 is then moved to the first of the three stops 128, and the cover 118 is closed to place the optical wedge 120 over a portion of the sample sheet where a first test image will be made. The flap 124 is opened to permit exposure through the optical wedge 120. The blue separation filter used above in calibrating the intensity for blue light is placed in the holder 24 and the device 26 is switched to its blue channel The blue exposure is then made for the predetermined number of seconds.

The second exposure through the optical wedge 120 goes on in similar fashion. The carriage 114 is moved to the second of the three stops 128 and the green separation filter replaces the blue separation filter in the holder 24. The device 26 is switched to its green channel. The green exposure is made for precisely the same time interval as for the previous blue exposure.

The last of the three exposures through the optical wedge 120 its achieved similarly using red light. The carriage 114 is moved to the last of lube three stops 128, and the red separation Filter is placed in the holder 24 in place of the green separation filter. The device 26 is switched to its red channel and then the red exposure is made for precisely the same time as the blue and green exposures.

Figure 5:
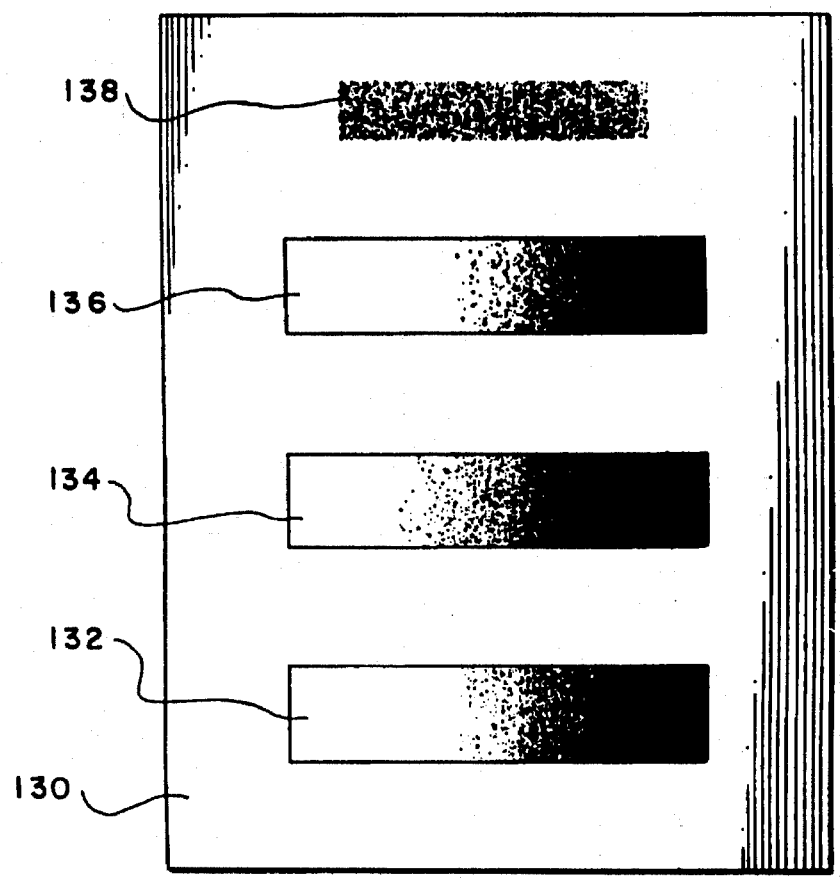
FIG. 5 is a plan view of a sample print made in accordance with the present invention.
Figure 6:
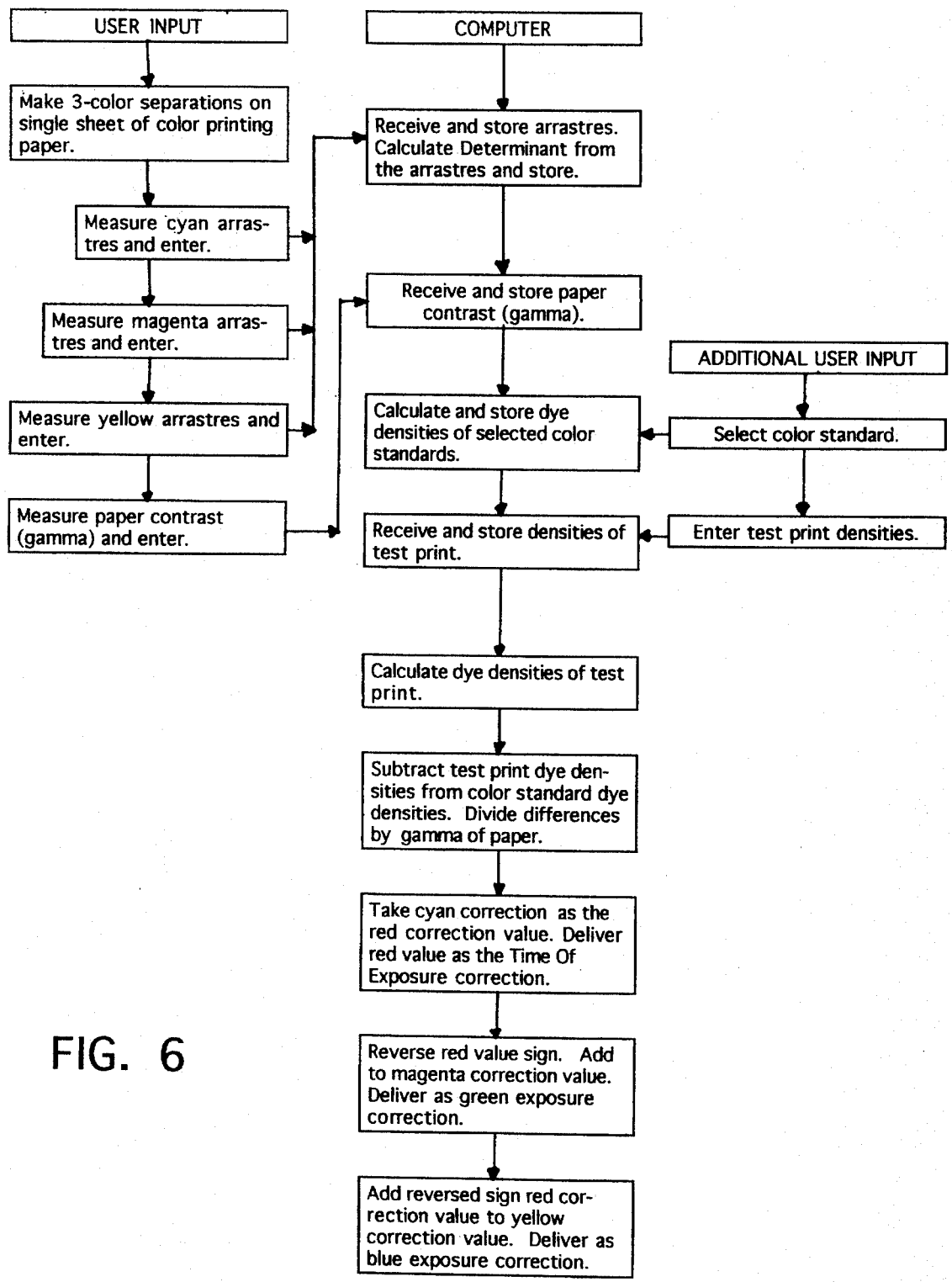
FIG. 6 is a flowchart of the process.

Upon processing of the sample sheet of printing paper using the usual laboratory processing techniques, three test images will appear as depicted in FIG. 5. A yellow image 132, a magenta image 134, and a cyan image 136, all of varying density, represent respectively the blue, green, and red exposures through the optical wedge 120.

Figure 3:
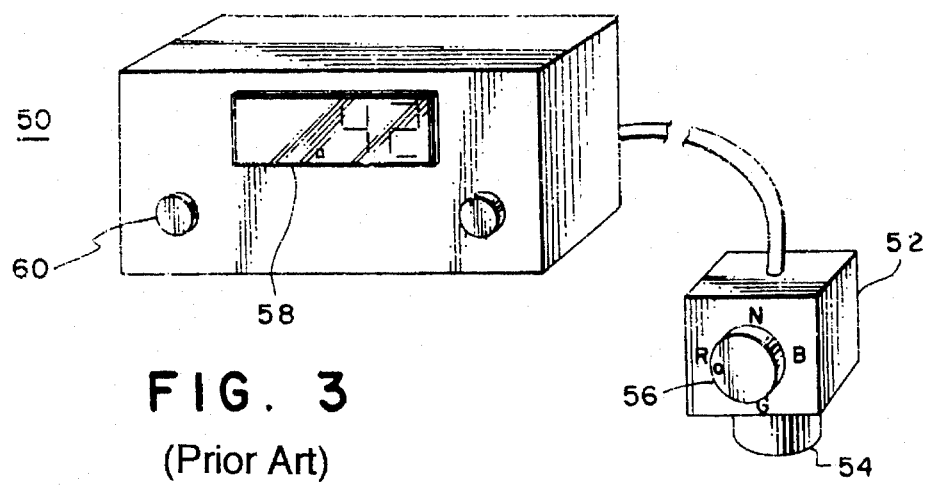
FIG. 3 is a view in perspective of a reflection densitometer for use with the present invention.

The procedural steps involved in determining the cross-absorbing arrastres in sample print 130 will now be described. The probe 52 of the reflection densitometer 50 of FIG. 3 is placed on a processed white, unexposed portion of test print 130. The reflection densitometer is zeroed for all three color channels against the white, unexposed but processed paper. The selector 56 of the probe 52 is switched to the red channel and the probe is moved along the cyan wedge image 136 until density exactly 1.00 is arrived at. Without moving the probe, the selector 56 is switched to the green channel. The density that appears in the readout of the reflection densitometer 50 is the cyan dye-green arrastre. Still without moving the probe 52 the selector is switched to the blue channel and the density that appears in the readout of the reflection densitometer 50 is the cyan dye-blue arrastre.

The measurement of the magenta arrastres comes next. The reflection densitometer is again zeroed for all three color channels against the unexposed processed white portion of the test print 130. The selector 56 is attached to the green channel and the probe 52 placed on the magenta dye image 134 of test print 130. The probe is moved along the magenta wedge image 134 until density exactly 1.00 is picked up. Without moving probe 52 selector 56 is switched to the red channel and the density that appears in the readout of the reflection densitometer 50 is the magenta dye-red arrastre. Again, without moving the probe 52 the selector 56 is switched to the blue channel and the readout of the reflection densitometer 50 is the magenta dye-blue arrastre.

For the third time the reflection densitometer is zeroed for all three color channels against the processed unexposed white of the test print 130. The selector 56 is switched to the blue channel and the probe 52 is placed on the yellow wedge image 132 of test sheet 130. The reflection density probe 52 is moved along the yellow wedge image 132 until density exactly 1.00 is picked up. Without moving the probe 52 the selector 56 is switched to the red channel and the readout in the reflection densitometer 50 is the yellow dye-red arrastre. Again, without moving the probe 52, the selector 56 is switched to the green channel and the readout of the reflection densitometer is the yellow dye-green arrastre.

Computer Participation

The values for all six arrastres are then entered into the computer. The arrastres thus stored will not be changed until a different set of values is entered.

The computer asks for the gamma of the printing paper. Measurement of the gamma is best taken from a nearly neutral image of the continuous linear optical wedge between density 0.50 and density 1.00. The value is entered into the computer. A default value is provided. In this embodiment the default value is 2.38, based on experience with a popular color printing paper. If the precise gamma is not known, it is better that the gamma be rated higher rather than lower than what is actually the case. The use of an unduly low gamma will cause corrections to overshoot whereas a higher gamma allows one to keep approaching the target from the same direction. This default value is probably more valid for one manufacturer's product than for that of another manufacturer. It may be changed at will.

The computer will then ask the person operating the system to select a color standard. The computer's memory will have values preset for the neutral gray card; for skin, Caucasian; for skin, Afro American; for skin, Hispanic; for average green foliage; and for "other." "Other" is not preset. If the user selects "Other" he or she will be asked to provide the red, green, and blue reflection densities for a different standard to be entered into the computer. The person doing the work will then be directed by the computer to make a test print from a negative containing an image whose reference standard has been selected. The user is directed to measure the red, green, and blue densities from the test print and to enter them. The computer then matches the test print densities against those of the selected standard, according to the mathematical technique previously described, and immediately prints on its screen the corrections to the trial print program at which it has arrived. The corrections will be: green exposure program, blue exposure program, and exposure index. The computer will ask whether to repeat the test print because of excessive correction(s).

Finally, before closing the program, the computer suggests that corrections be obtained for other reference standards using the same input data. If the user agrees, the computer returns the user to the area where color standards are selected. Often when a color program is achieved which will give proper color balance to a whole roll of different exposures as, for example, with the gray card reference, individual negatives on the roll may lack a gray card standard of reference for determining exposure time. Using several standard of color reference will provide a number of different exposure times without upsetting the color balance already in place. In this system overall exposure is referred to the red exposure. It is a great help therefore if exposure times are always read with a red filter placed over the aperture in the color analyzer probe.

OTHER EMBODIMENTS

A less general and more limited embodiment is envisaged when a manufacturer of color printing papers would provide a somewhat modified version of the computer program to accompany the sale of each different emulsion number of product. In such case the manufacturer would provide, based on in-shop analysis of each such different lot of color printing paper, the pertinent arrastres and paper contrast. The manufacturer might even wish to change the reflection density values for each of the color and density standards, in compliance with the wishes or taste of the clientele that buys the paper. In such case the values for all the above would be inserted in the source code from which the application program derives. The fixed values would not be insertable by the user and would not appear in a dialog box. All the user would have to do would be to choose the standard desired: gray card, skin, . . . , etc., and to make the appropriate test print. The extra effort by the user would be minimal. At the same time, the paper manufacturer would not be required to go to the expense of tooling new equipment. The data needed would come as part of the work of the quality control department.

Such programs would be varied depending on the characteristics of each particular lot of color printing paper. When necessary, a new diskette with a new pertinent program would be made available. Based on experience with a number of different manufactures of colored printing paper, at the present time it is unlikely that the program generated for one brand will serve satisfactorily for another.

Still other embodiments can readily be found in applications directed toward printing positive-negative motion picture films; in negative-negative films, including slide copying; and in many forms of photo-lithography.

Although preferred embodiments have been described in detail, it is to be understood that various changes, substitutions and alterations can be made therein without departing from the spirit and scope of the invention as defined in the appended claims. In the appended claims, wherever the term "paper" or "color printing paper" is used it is to be read to include each and every type of color printing media, including but not limited to photographic films and photo-lithographic media.

What is claimed is:

1. A method for ascertaining simultaneously the color balance and printing density of photographic color printing paper of the type having three superimposed light-sensitive layers, each of which is selectively responsive to a different primary color of light, each of which produces a dye image of a color nominally complementary to the color of the light by which, it is exposed, reel light producing an image composed of cyan dye, green light producing an image composed of magenta dye, and blue light producing an image composed of yellow dye, and by (a) measuring for the cyan dye the relative absorptions of red, green and blue light, and by (b) measuring for the magenta dye the relative absorptions of red, green and blue light, and by (c) measuring for the yellow dye the relative absorptions of red, green and blue light, and by (d) using the relative color absorptions of each of the said three dyes to form 3×3 matrices from which third-order determinants are calculated and applied by Cramer's Rule to determine the densities of each of said three dyes needed to produce the known reflective color densities of a selected color standard, and by (e) using the relative color absorptions of each of the said three dyes to form 3×3 matrices from which third-order determinants are calculated and applied by Cramer's Rule to determine the densities of each of said three dyes needed to produce the reflective color densities measured in an image made of the color standard selected in step (d) in a test print, and by (f) calculating from the differences between the dye densities of the standard chosen in step (d) and the dye densities of the test print image in step (e) the exposure changes for red, green and blue light needed to produce a subsequent print in which the image of the standard chosen in step (d) substantially matches that standard.

2. The method of using three separate continuous wedge images, one of cyan dye, one of magenta dye and one of yellow dye, produced by separate exposures of the color printing material through a continuous optical wedge by red light, by green light and by blue light respectively to facilitate the measurement of the relative absorptions, in decimal terms, of each of the primary colors by each of the dyes, and by (a) finding on the cyan dye wedge image the 1.00 reflection density for red absorption and measuring at the very same point on the cyan dye wedge image the reflection densities for green absorption and blue absorption, and by (b) finding on the magenta dye wedge image the 1.00 reflection density for green absorption and measuring at the very same point on the magenta dye wedge image the reflection densities for red absorption and blue absorption, and by (c) finding on the yellow dye wedge image the 1.00 reflection density for blue absorption and measuring at the very same point on the yellow dye wedge image the reflection densities for green absorption and red absorption.

3. A method for simultaneously ascertaining the color balance and printing density of photographic color printing paper of the type having three superimposed light-sensitive layers, each of which is selectively responsive to a different primary color of light, each of which produces a dye image of a color nominally complementary to the light by which it is exposed: red light exposure producing a cyan dye image, green light exposure producing a magenta dye image and blue light exposure producing a yellow dye image, comprising the steps:

(a) arranging the relative densities of the red, green, and blue absorbing elements of each dye in columnar form with the elements of one dye forming a column on the left, of the elements of a second dye forming a column in the middle and the elements of the third dye forming a column on the right, the relative cyan dye absorptions being placed in the left-most column, the relative magenta dye absorptions being placed in the center column and the relative yellow dye absorptions being placed in the right-most column, the final structure being identified as a known mathematical entity called a 3×3 matrix, having a known value termed the Determinant (D), and (b) solving said matrix for its Determinant (D) as the third-order determinant, followed by (c) substituting in the left-most column of the matrix the red, green, and blue reflection densities, in the order in which they appear in any given usage, of a color standard against which the paper is to be balanced and solving this new matrix in the same manner as was done in step (b) to obtain a new Determinant ($D_1$), and dividing this new Determinant by the Determinant (D) found in step (b) to discover the cyan dye density required to produce said color standard, and by (d) substituting in the center column of the matrix the red, green, and blue reflection densities of a color standard against which the paper is to be balanced and solving this new matrix in the same manner as was done in step (b) to obtain a new Determinant ($D_2$), and dividing this new Determinant by Determinant (D) found in step (b) to discover the magenta dye density required to produce said color standard, and by (e) substituting in the right hand column of the matrix the red, green, and blue reflection densities of the color standard against which the paper is to be balanced and solving this new matrix in the same manner as was done in step (b) to obtain a new Determinant ($D_3$), and dividing this new Determinant by the Determinant (D) found in step (b) to discover the yellow dye density required to produce said color standard, and by (f) making a test print from a negative containing the image of a color standard chosen in step (c), and by (g) measuring on the processed test print the red, green, and blue reflection densities of the image corresponding to the said color standard, and by (h) substituting the red, green, and blue reflection densities of the test print of step (g) in the left-most column of the 3×3 matrix of step (a) and solving this new matrix in the same manner as was done in step (b) to obtain a new Determinant ($D_4$), and dividing this new Determinant by the Determinant (D) found in step (b) to discover the cyan dye density that was part of the test print image of the color standard, and by (i) substituting the red, green, and blue reflection densities of the test print of step (g) in the center column of the 3×3 matrix of step (a) and solving this new matrix in the same manner as was done in step (b) to obtain a new Determinant ($D_5$), and dividing this new Determinant by the Determinant (D) found in step (b) to discover the magenta dye density that was part of the test print image of the color standard, and by (j) substituting the red, green, and blue reflection densities of the test print of step (g) in the right-most column of the 3×3 matrix of step (a) and solving this new matrix in the same manner as was done in step (b) to obtain a new Determinant ($D_6$), and dividing this new Determinant by the Determinant (D) found in step (b) to discover the yellow dye density that was part of the test print image of the color standard, and by (k) subtracting the cyan dye density discovered in step (h) from the cyan dye density discovered in step (c), dividing the difference by the slope of the linear portion of the color printing paper's sensitometric curve, to obtain the over-all exposure correction necessary to produce a subsequent print substantially matching the color and density of the chosen color standard, and by (l) subtracting the magenta dye density discovered in step (i) from the magenta dye density discovered in step (d), dividing this difference by the slope of the linear portion of the color printing paper's sensitometric curve to obtain the change in green light exposure which produces the needed change in magenta dye density, by reversing the sign of the over-all exposure correction discovered in step (k) and adding it to the needed green light exposure change to obtain the green light exposure correction necessary to produce a subsequent print substantially matching the color and density of the chosen color standard, and by (m) subtracting the yellow dye density discovered in step (j) from the yellow dye density discovered in step (e), dividing the this difference by the slope of the linear portion of the color printing paper's sensitometric curve to obtain the change in blue light exposure which produces the needed change in yellow dye density, by reversing the sign of the over-all exposure correction discovered in step (k) and adding it to the needed blue light exposure change to obtain the blue light exposure correction necessary to produce a subsequent print substantially matching the color and density of the chosen color standard.

* * * * *